May 10, 1960

F. E. FAUTH 2,936,071

CONTAINER INSPECTION MECHANISM

Filed April 12, 1954

INVENTOR
Frederick E. Fauth
BY Cushman Darby
V Cushman
ATTORNEYS

INVENTOR
Frederick E. Fauth

May 10, 1960

F. E. FAUTH 2,936,071

CONTAINER INSPECTION MECHANISM

Filed April 12, 1954

INVENTOR
Frederick E. Fauth

BY
Cushman, Darby & Cushman
ATTORNEYS

United States Patent Office 2,936,071
Patented May 10, 1960

2,936,071

CONTAINER INSPECTION MECHANISM

Frederick E. Fauth, Baltimore, Md., assignor to Crown Cork & Seal Company, Inc., Baltimore, Md., a corporation of New York Application April 12, 1954, Serial No. 422,474

12 Claims. (Cl. 209—88)

The present invention relates to container inspection mechanism and, more particularly, to mechanism for detecting abnormal pressure in a filled container.

Under present-day packaging procedure, a large proportion of food products are packaged in glass containers closed by metal caps and with a low pressure condition established in the container. One procedure for establishing the low pressure condition is to fill the container headspace with steam during capping of the container within a steam tunnel so that when the headspace temperature subsequently lowers, the condensation of the steam will create lower than atmospheric pressure in the container headspace. In some instances, the low pressure condition mentioned above is relied upon to hold the cap upon the container but it also may be established simply to reduce the amount of air, and hence, oxygen, in the container headspace.

In order to determine whether a container actually has a desired low pressure condition therein, it heretofore has been the practice to periodically remove filled and sealed containers from the outfeed portion of a "steam" capping line and apply a testing gauge to the top of the container. Such testing gauges usually include an element which pierces the container top to permit the pressure in the container headspace to flow into the gauge. The mutilation of the cap occasioned by such testing necessitates returning the container to the capping line regardless of whether the headspace pressure was too high or was correct.

Aside from the fact that the testing procedure described above necessitates a second sealing of the container, it has the obvious drawback of being only a "sample" test. However, such previous arrangements as have been proposed to test every container and without piercing the container top have not been applicable with high speed output of filled containers. Also, the prior arrangements applicable for testing every container in the output of a capping machine have been of such design that containers moving past the same may be marred or scratched during the testing procedure. Such arrangements are particularly undesirable in the handling of jars which are closed by a cap bearing lithography designs.

An object of the present invention is to provide a mechanism for determining the headspace pressure in a filled container without interrupting the movement of the container and without marring the closure.

In the capping of glass containers, a container occasionally has a cap improperly positioned thereon so that the cap is tilted or canted upwardly with respect to the container mouth. Glass containers of a given size also may vary in height, or various conditions may result in one capped container or can being slightly higher than another in the same run. Because testing mechanisms of the type under discussion usually must have their container engaging elements positioned at a given distance from the surface on which the container is moving, difficulties heretofore have been encountered in testing such containers.

Another object of the invention is the provision of a mechanism for determining the pressure in a filled container and which mechanism is of such design that it will not be damaged by a container of greater than normal height; for example, a capped container which does not have a cap properly applied thereto.

A further object of the invention is to provide a mechanism for testing container headspace pressure and removing abnormal pressure containers from the output line, the mechanism being of such construction that it also will remove improperly capped containers.

The embodiment of the invention disclosed herein is described in connection with jars closed by caps. However, as is indicated by the foregoing objects, the invention also is adapted for the handling of cans.

Other objects and advantages will be apparent from the following specification and accompanying drawings.

Figure 1:
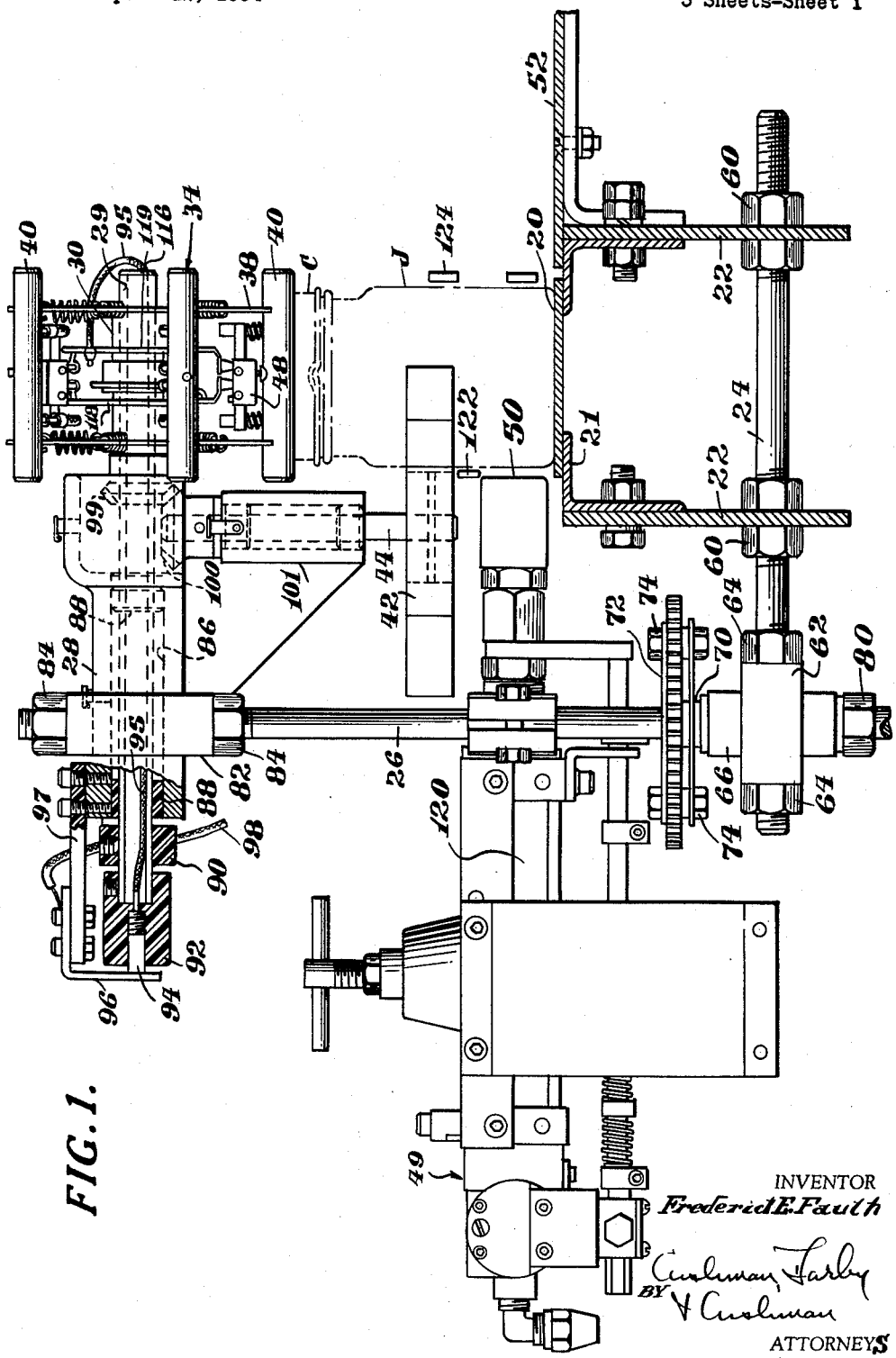
Figure 1 is a side elevation of the mechanism of the invention, with portions in vertical section.
Figures 3, 4, 5:
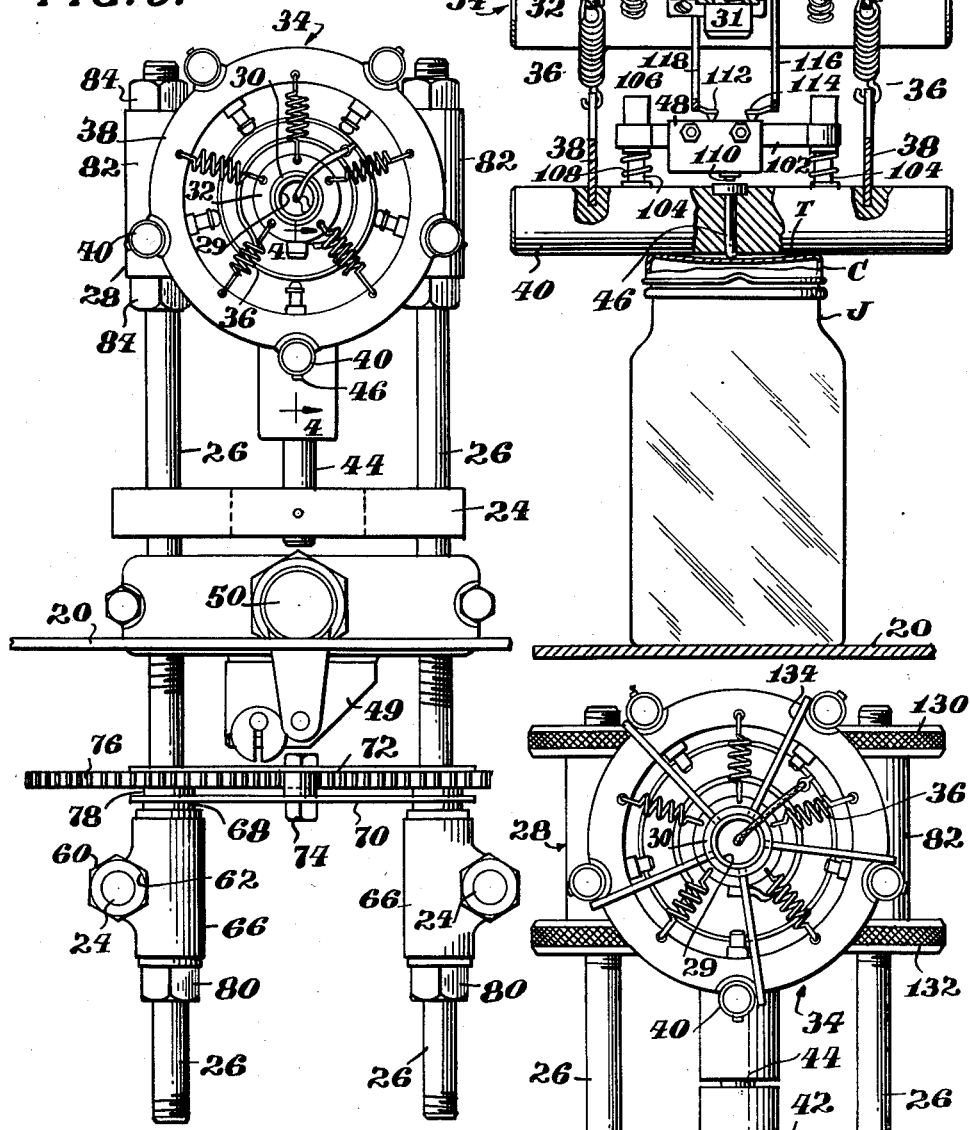
Figure 3 is an end view looking toward the device from the right of Figures 1 and 2.
Figure 4 is a radial section on the line 4—4 of Figure 3.
Figure 5 is a view similar to Figure 3 but showing only the upper portion of the device built according to a modified design.

The construction and operation of the mechanism generally may be described as follows: Referring to Figure 1, the mechanism will be positioned alongside a conveyor 20 which usually will be of straight-line type and movable upon a fixed framework 21 including attached depending plates such as 22. The mechanism of the invention is secured to the plates 22 by means of a pair of horizontal rods 24 which extend through the plates 22, the horizontal rods 24 having a pair of vertical rods 26 adjustably secured thereto to extend upwardly alongside of and above conveyor 20. The vertical rods 26 support a housing 28 between their upper ends and a horizontally arranged hollow shaft 29 journalled in housing 28 extends beyond the housing and out over conveyor 20. As shown in Figures 1 and 4, on the end of shaft 29 which is over conveyor 20, shaft 29 has a collar 30 secured thereto by a set screw 31, collar 30 being provided at each end with a radially extending flange 32 best shown in Figure 4.

A detector wheel generally designated 34 is secured to the flanges 32. In more detail, as best shown in Figure 3, each flange 32 of collar 30 has a number of tension coil springs 36 extending radially outwardly therefrom to one of a pair of ring elements 38 respectively radially aligned with the flanges 32 of collar 30, the two ring elements 38 forming part of wheel 34 and being secured in spaced relation by detector bars 40 lying outwardly of the ring elements 38. Because the springs 36 are equidistantly spaced from each other about the wheel 34 and are of uniform characteristics, the two ring elements 38 normally will be maintained concentric with shaft 29 and the detector bars 40 normally will lie parallel to shaft 29.

Figure 2:
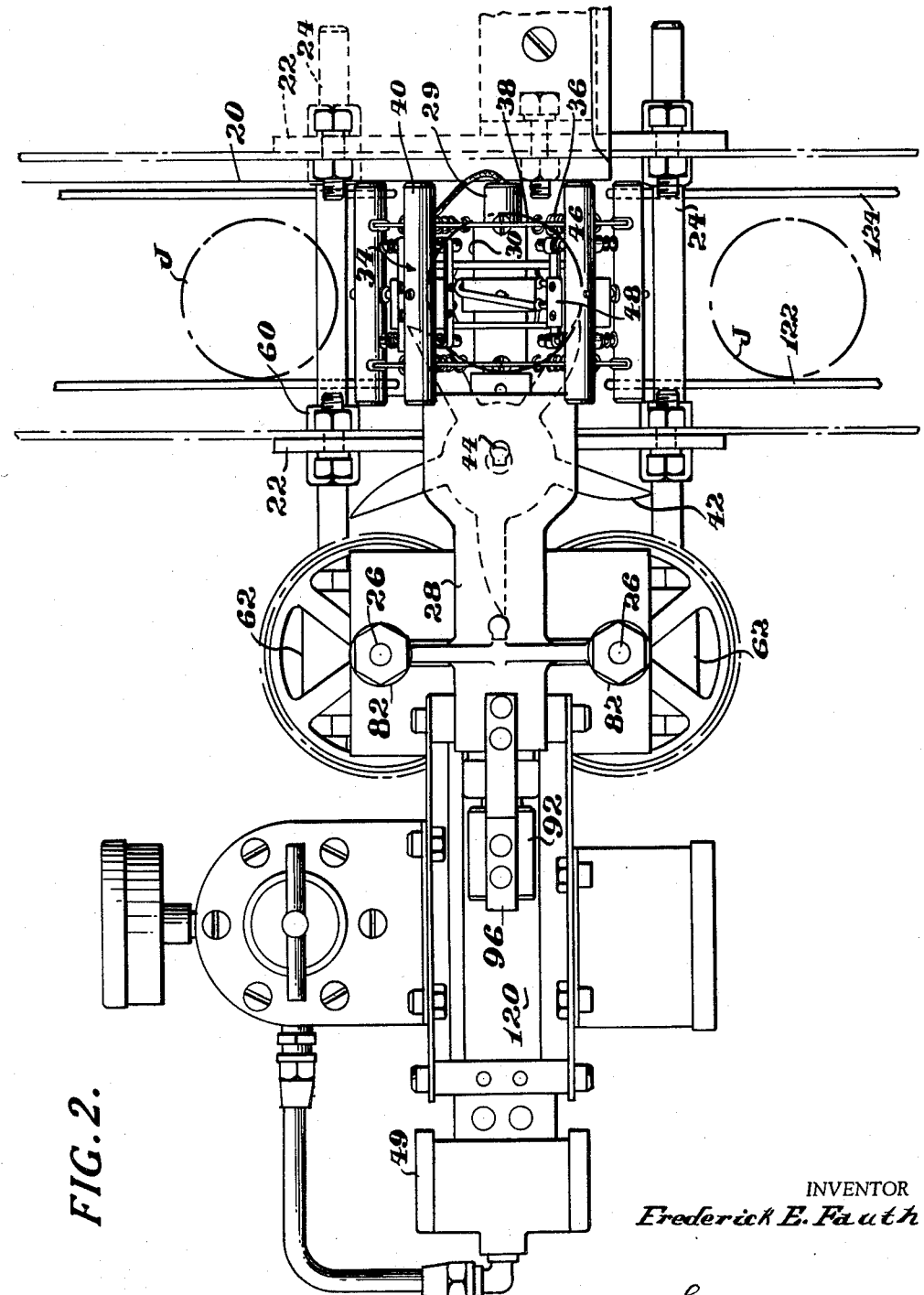
Figure 2 is a plan view of the mechanism.

In operation, referring to Figure 2, a container J moving with conveyor 20 will engage a star wheel 42 fixed to a vertical shaft 44 which is geared to shaft 29. The movement of container J with conveyor 20 will cause star wheel 42 to rotate shaft 29 and detector wheel 34 in such manner that as the container J moves forward with conveyor 20 wheel 34 will rotate counterclockwise as viewed in Figure 3 to carry one of the detector bars 40 downwardly into engagement with the top wall T of the cap C on container J, as illustrated in Figure 4. In this position bar 40 will lie crosswise of conveyor 20 to bear on diametrically opposite peripheral portions of the cap top wall. If the jar J has the proper degree of vacuum therein, the central portion of the top wall of the cap C will have been drawn downwardly by the vacuum condition as illustrated in Figure 4. Therefore, the outer and lower end of a detector pin 46 slidable through the central portion of each bar 40 will not be moved inwardly and radially of its bar 40 a sufficient distance to cause an electric switch 48 to be closed. Switch 48 is in circuit with an ejector device 49 including an air actuated plunger 50 best shown in Figure 1, plunger 50 normally having its outer end positioned as shown in Figure 1. If the cap C is in the condition illustrated in Figure 4 and, therefore, the proper degree of vacuum exists within the container headspace, switch 48 will not be closed and plunger 50 will remain retracted. However, if a container does not have the proper degree of vacuum within its headspace, the top wall T of the cap C will not have been drawn or sucked downwardly to a position such as indicated in Figure 4, but will lie flush with or above the peripheral portion of the cap top wall T. In such case, the central portion of top wall T will engage the detector pin 46 to move the latter slightly upwardly through bar 40. As a result, switch 48 will be closed and the air operated plunger 50 will be moved to the right as viewed in Figure 1 with the result that the jar will be pushed from conveyor 20 on to a reject table 52.

It will be noted that because the detector wheel 34 is resiliently mounted with respect to the shaft 29, if a capped container has a slightly greater than normal height, wheel 34 will move upwardly with respect to shaft 29 to accommodate such increased height. In normal operation, in handling any run of containers, the position of the shaft 29 with respect to the surface of the top run of conveyor 20 will be so adjusted that the detector bars 40 will properly engage the peripheral edge of the top wall T of a cap C upon a container of minimum height permissible by container and cap standards.

As has been indicated above, another purpose of having the wheel 34 resiliently mounted with respect to shaft 29 is to enable jars J having cocked or canted caps C to move beneath the detector. For example, such a cap might have at least one edge thereof extending substantially above normal height. In such event, the detector bar 40 engaged by the canted cap will be permitted to tilt and thereby squarely bear upon the cap top wall T. A jar J provided with an improperly applied cap will not have the desired vacuum condition within its headspace and, therefore, the central portion of the cap will contact with the detector pin 42 to actuate the corresponding switch 48 so that plunger 50 will be moved to the right from the position of Figure 1 to thereby eject such jar from the conveyor 20.

As is hereinafter described, the mechanism includes means to adjust the height of the detector wheel 34 with respect to conveyor 20 and adjust the stroke of ejector plunger 50, as well as other adjustments to accommodate containers of various sizes.

It will be obvious that the mechanism readily can be used to test cans for abnormal pressure or deformed ends.

The detailed construction and operation of the mechanism is set forth below.

As best shown in Figure 1, the conveyor 20, which usually will be of the flat metal link type, will have its upper run supported upon angle beams 21 which are supported by a suitable frame, not shown. The depending plates 22 which secure the present mechanism to the beams 21 are bolted to the latter and, as best shown in Figure 2, the two horizontal rods 24 extend through the plates 22 and are threaded so that they may be secured to the plates by nuts 60. Adjacent its outer end, each horizontal rod 24 has a sleeve 62 clamped thereon by means of another pair of nuts indicated at 64 in Figure 1. One of a pair of similar sleeves 66 is welded to each sleeve 62 at such angle that the bores of the sleeves 66 extend vertically. The vertically extending supporting rods 26 are fitted in the bores of the vertical sleeves 66.

Figures 1 and 3 show one manner of supporting each vertically extending rod 26 in its sleeve 66. By this arrangement, each rod 26 has a washer 68 loosely mounted thereon beneath a horizontal plate 70 through which the rod extends, plate 70 being of sufficient area that both rods extend therethrough. A second and similar plate 72 is secured to the lower plate 70 by bolts and nuts 74. Two meshing pinions 76 are positioned between the plates 70 and 72, one pinion being mounted on each rod 26. Each pinion 76 includes a hub 78 threaded to engage threads on the corresponding rod 26, the threads of the rods 26 being respectively reversed. Because the two pinions 76 mesh, simultaneous vertical movement of both of the rods 26 as well as the mechanism supported thereby can be obtained by rotating one pinion 76. The rods 26 are held against rotation by their connection to housing 28 hereinafter described.

It will be observed that if the rods 26 are to be lowered to thereby lower the mechanism carried thereby, the pinions 76 may be rotated to travel up the rods 26, so that the rods will slide down through the sleeves 66. When the desired movement has been obtained, a nut 80 on each rod 26 may be threaded upwardly against the lower end of the corresponding sleeve 66 to lock the rods against lifting. If the rods 26 are to be elevated, the nuts 80 will have to be backed downwardly before the pinions 76 are rotated.

At their upper ends the two rods 26 carry the housing 28, housing 28 including an apertured boss 82 at each side thereof through which the rods 26 extend. The housing 28 is clamped upon the upper ends of the rods 26 by means of nuts 84 bearing on the upper and lower ends of the bosses 82. It will be observed that the manner of securing the housing 28 to the upper ends of the rods 26 holds the latter against rotation when the pinions 76 are rotated to raise or lower the rods.

Referring to Figure 1, the housing 28 includes a horizontal bore 86 fitted with suitable bearings 88 which form a journal for the hollow shaft 29. Shaft 29 has wheel supporting collar or sleeve 30 secured to its end above conveyor 20 and its other end has a positioning collar 90 fixed thereto. A circular block 92 of insulating material is secured to shaft 29 outwardly of collar 90 and block 92 has a brush 94 positioned centrally thereof and to which is connected one end of a wire 95 which extends entirely through the hollow shaft 29 and thence is connected to one side of each of the switches 48 as hereinafter described. Referring again to the left-hand portion of Figure 1, a contact strip 96 fixed to housing 28 by means of a plate 97 formed of insulating material contacts with the brush 94, rotating brush 94 and plate 96 thereby serving to electrically connect wire 95 in rotating shaft 29 with a wire 98 forming one side of the circuit to the valve mechanism 49.

Shaft 29 has a bevel gear 99 fixed thereto inwardly of collar 30 and gear 99 meshes with a bevel gear 100 fixed to the vertical shaft 44 which carries the container-actuated dial or spider 42. Shaft 44 is suitably journalled in a downward extension 101 of housing 28.

The manner of supporting the detector wheel 34 from the collar 30 secured to shaft 29 so that the wheel 34 will be rotated by engagement of a container J with dial 42 will be clear from the general description set forth above. As best shown in Figure 4, the switches 48 respectively associated with the detector bars 40 are each positioned upon the inner face of the bar in a small platelike frame designated 102. Each end of plate 102 is apertured so that the plate may slide upon a pair of studs 104 secured to and spaced apart on the inner face of each bar 40. Each stud 104 is threaded to receive a knurled collar 106 and the plates 102 are held outwardly against the collar by coil springs 108. The actuating button 110 of each switch 48 faces toward its detector bar 40 to lie in the path of movement toward shaft 29 of the corresponding detector pin 46.

Each switch 48 has a pair of connectors or binding posts 112 and 114 on the inner wall of its housing. The connectors 114 of all five switches 48 illustrated are electrically connected by a split circular band 116 which has the wire 95 connected thereto. The other connector 112 of each switch 48 is connected to a band 118 which may be grounded to the metal frame of the mechanism or wired to the ejector mechanism 49.

By reason of the above-described connection of the switches 48 in parallel with each other to the valve mechanism 49, the closing of any switch 48 will energize the solenoid operated valve 49 to cause compressed air to flow to air cylinder 120 to thereby move the container ejecting plunger 50 to the right in Figure 1. When the plunger completes its outward movement, it will shift valve 49 to cause the plunger to be retracted.

As is generally explained in the opening portion of this specification, a container J moving on the conveyor 20 in the direction of the arrow of Figure 2 will be guided into engagement with the star wheel 42 between spaced rails 122 and 124. The movement of the container J with conveyor 20 will rotate star wheel 42 and the latter thereby will rotate the shaft 29 and detector wheel 34. If the headspace pressure within a container J is sufficiently low to cause the top wall T of a cap C to be drawn downwardly as indicated in Figure 4, the detector pin 46 will not be pushed upwardly or toward shaft 29 to actuate the corresponding switch 48 even at the instant when the detector bar 40 is directly vertically aligned with the container axis. The gearing between the star wheel 42 and detector wheel 34 is such that when a container is centered between two arms of the star wheel, one of the detector bars 40 then will bear squarely upon the top wall of the container and in the plane of the container axis.

If the headspace of a container J is not at the desired low pressure, at least by the moment that a detector bar 40 is bearing squarely on the top wall T of a cap C, detector pin 46 will be moved upwardly, thereby closing the corresponding switch 48 so that plunger 50 will be snapped by compressed air to push the container J between a gap in the outer guide rail 124 and on to the reject table 52, plunger 50 immediately will be retracted and before conveyor 20 can bring a second container into contact with plunger 50. The entire action readily can be arranged to occur at such speed that containers moving on conveyor 20 and in contact with each other readily can be handled.

As has been explained above, if a cap C is canted on a container J or if a container and cap are of greater than normal height, the provision of the springs 36 to support the detector wheel 34 will enable the latter to tilt with respect to shaft 29 so that the mechanism will not be jammed or injured in any way. Because a jar J having its cap C improperly applied invariably will have its headspace at greater than desired pressure, viz., atmospheric pressure, the top wall of such cap will not be sucked inwardly as indicated in Figure 4 and the container will be ejected by plunger 50. Hence, the present invention is useful in detecting improperly capped jars or distorted cans as well as jars and cans which are not at the desired headspace or internal pressure.

It will be understood that the switches 48 readily may be moved toward and away from their detector bars 40 so that the switches 48 can be set to close when the detector pins 46 move a predetermined amount.

It will be understood that, if desired, the closing of a switch 48 may actuate an alarm of either visual or audible type. Also, it will be noted that if an ejector device such as the plunger 50 is provided, it will give indication of the condition of a container. That is, the fact that the plunger 50 ejects a container from the conveyor 20, clearly indicates that the container is defective in some respect.

Figure 5 shows a modified arrangement for adjusting the height of the housing 28 and detector wheel 34 with respect to the conveyor 20. According to the Figure 5 arrangement, housing 28 is secured upon the upper end portion of the rods 26 by means of knurled hand wheels 130 and 132 threaded upon the upper ends of the rods 26 and which respectively engage the upper and lower ends of the bosses 82 of housing 28. When this arrangement is used, the pinions 76 illustrated in Figure 3 are eliminated from the lower portion of the structure and the rods 26 are secured in the lower sleeves 66 by means of the nuts 80 shown in Figure 3 as engaging the lower ends of the sleeves 66 and similar nuts provided at the upper ends of the sleeves 66. It will be obvious that if the position of housing 28 is to be adjusted relative to conveyor 20, for example, upwardly, the upper wheels 130 may be threaded upwardly away from housing 28 and then the lower wheels can be threaded upwardly to lift the housing. When the desired adjustment has been obtained, all of the nuts can be tightened against the housing.

Figure 5 also shows an arrangement to insure that the detector ring 34 will be held in the desired position circumferentially of the shaft 29 and central collar 30. In more detail, assuming that the detector wheel 34 will be rotated counterclockwise as viewed in Figure 5, a number of pins 134 will project radially from collar 30, the outer end of each pin being immediately in advance of a detector bar 40. However, the detector bars will not be fixed to the pins. By this arrangement, although a detector bar 40 and the adjacent portion of the detector ring 34 may be moved radially inwardly toward collar 30 if a container is of greater than normal height or has a cap improperly applied thereto, nevertheless, the detector ring 34 cannot be pushed circumferentially and counterclockwise with respect to the collar 30 because the pins 134 will resist such movement.

The terminology used in the specification is for the purpose of description and not of limitation, the scope of the invention being indicated in the claims.

I claim:

1. In a mechanism for detecting abnormal condition of a filled container, a support, a shaft element mounted in said support, a first container engaging member to contact a portion of a container end surface, means to normally support said first member in a predetermined position with respect to said shaft element and enable said first member to move about as well as bodily with respect to said shaft element, a second container engaging member carried by said first member and movable relative to the latter, said second member being adapted to contact another portion of the container end surface, and means responsive to the position of said two members with respect to each other to indicate an abnormal filled container.

2. Mechanism of the character described in claim 1 including means engageable by a container to move said members about said shaft element.

3. Mechanism of the character described in claim 1 including container operated means to rotate said shaft element in said support, said shaft element being rotatable with respect to said support about a horizontal axis and said container operated means being rotatable with respect to said support about a vertical axis.

4. Mechanism of the character described in claim 1 wherein said last-mentioned means includes an element to move an abnormal container out of engagement with said first and second members.

5. In a mechanism for detecting abnormal pressure in a filled container, a support, a shaft element, a wheel device mounted on said shaft element and rotatable with respect to said support, means to normally support said wheel device concentric with said shaft element, said wheel device including a plurality of container engaging bar members fixed thereto parallel to said shaft element, a plurality of pins, one on each of said bar members for movement radially of said wheel device, and a plurality of electrical switches, one carried by each of said bar members and responsive to movement of a pin member with respect to the corresponding bar member.

6. A mechanism of the character described in claim 5 wherein said means to support said wheel device concentric with said shaft element comprises a series of radially extending coil springs.

7. A mechanism of the character described in claim 5 including a second shaft element operatively connected to and extending at right angles to said first-mentioned shaft element, and container-engageable means carried by said second shaft element.

8. A mechanism of the character described in claim 5 including means to prevent said wheel device from rotating relative to said shaft element.

9. In combination, a framework, a conveyor movable on said framework, a shaft housing, a horizontal shaft and a vertical shaft each rotatably journaled in said housing, a first means for drivingly connecting said shafts to each other, a star wheel carried by said vertical shaft in a path of a container moving with said conveyor, said star wheel being engaged by and rotated by a container moving with said conveyor to thereby rotate said vertical shaft, and a second means for indicating condition of a container, said second means including a detector member carried by and rotated by said horizontal shaft for engaging the top portion of the container as it is engaged by said star wheel.

10. A combination of the character described in claim 9 wherein said detector member includes a container engaging linear surface and wherein resilient means is provided for normally maintaining said surface parallel to said horizontal shaft.

11. A combination of the character described in claim 9 including a third means to adjust the position of said shaft housing with respect to said framework, said third means including a pair of rotatable vertical shafts and a fourth means to rotate said shafts simultaneously.

12. A combination of the character described in claim 9 wherein said indicating means includes a member to eject a container from said conveyor.

References Cited in the file of this patent

UNITED STATES PATENTS

| | | |
|---|---|---|
| 2,093,429 | Foss | Sept. 21, 1937 |
| 2,324,783 | Kronquest | July 20, 1943 |
| 2,374,140 | Shoner | Apr. 17, 1945 |
| 2,445,176 | Hoffman | July 13, 1948 |
| 2,700,465 | Pechy et al. | Jan. 25, 1955 |